United States Patent

Pastor

[11] Patent Number: 5,142,577
[45] Date of Patent: Aug. 25, 1992

[54] METHOD AND APPARATUS FOR AUTHENTICATING MESSAGES

[76] Inventor: Jose Pastor, 191 Wilton Rd., Westport, Conn. 06880

[21] Appl. No.: 628,820

[22] Filed: Dec. 17, 1990

[51] Int. Cl.$^5$ .............................................. H04L 9/02
[52] U.S. Cl. ...................................... 380/21; 380/23; 380/51; 380/55
[58] Field of Search ............ 380/21, 23, 28, 29, 380/30, 51, 55; 364/464.02

[56] References Cited

U.S. PATENT DOCUMENTS

| | | | |
|---|---|---|---|
| 4,853,961 | 8/1989 | Pastor | 380/21 |
| 4,873,645 | 10/1989 | Hunter et al. | 364/464.02 X |
| 4,935,961 | 6/1990 | Gargiulo et al. | 380/21 |
| 5,005,200 | 4/1991 | Fischer | 380/25 X |
| 5,018,196 | 5/1991 | Takaragi et al. | 380/30 |
| 5,073,935 | 12/1991 | Pastor | 380/30 |

FOREIGN PATENT DOCUMENTS 0214609  3/1987  European Pat. Off. .............. 380/23

*Primary Examiner*—Tod R. Swann
*Attorney, Agent, or Firm*—Robert H. Whisker; Melvin J. Scolnick; David E. Pitchenick

[57] ABSTRACT

A method and system for authenication of communications. More particularly the subject application discloses a method and apparatus whereby a third party may validate that a communication is an authentic communication from a second party sent with the authorization of a first party. For example, the third party may be a postal service, the second party may be a mailer, and the communication may be a postal indicia showing that a mail piece has been properly franked. The first party and the second party share an encryption key, or a series of keys. The first party also has a second encryption key which the third party has the ability to decrypted. In the subject invention the first party encrypts a key shared with the second party with the first party's second key and transmits this to the second party. The second party then uses its copy of the key to encrypt information and appends its encrypted information to the message received from the first party and transmits all this to the third party. The third party may then decrypt the copy of the key encrypted by the first party and use this information to decrypt the information encrypted by the second party. The known technique of eliptical logarithms may be used to provide highly secure encryption of short messages. The second party may be a mailer and the apparatus of the subject invention may include a postage meter which prints the information transmitted to the third party, who may be a postal service, on a mail piece as a postal indicia.

21 Claims, 3 Drawing Sheets

METHOD AND APPARATUS FOR AUTHENTICATING MESSAGES

BACKGROUND OF THE INVENTION

The subject invention relates to a method and apparatus for authentication of communications. More particularly, it relates to a method and apparatus whereby a third party may validate that a communication is an authentic communication from a second party sent with the authorization of a first party. Still more particularly, the third party may be a postal service and the second party may be a mailer and the communication may be a postal indicia indicating that a mail piece has been properly franked.

(The following definitions and notations are used in the subject application:

E,D — are a pair of keys used in a "public key" encryption system.

K — is a key used in a "secret key" encryption system.

Keys may be specified by use of subscripts or functional notation as necessary. For example, $K_i(t)$ is the key used by the ith party for transaction t.

$E[M]$; $D[M]$; $K[M]$ — represent encryption, using the specified key and the appropriate corresponding encryption technique, of a message M.

$E[D[M]]$; $D[E[M]]$; $K[K[M]]$ — represent decryption, using the specified key and the appropriate corresponding encryption technique; of the encrypted message M.

(M1, E[P]) — represents an unencrypted message comprising the specified elements. Note elements may have been previously encrypted.

{a'} — represents a set of numbers or values.

Hard/easy — as applied to a computation refers to the relation between the cost of the computation and the value of the result. A computation is "hard" if the cost of performing it, using the best available algorithm, is substantially greater than the value of the result. (Those skilled in the art will recognize that this definition of "hard" differs from that used in complexity theory — where an algorithm is considered hard if the number of steps increases with exponential rapidity with the size of the operand. While the two concepts are related the present definition is preferred in the context of the subject invention, which relates to the protection of economic value rather than theoretical consideration of complexity.)

The "order of a number or variable refers to the number of digits, or bits, needed to express the number or the greatest allowed value of the variable.)

U.S. Pat. No. 4,853,961; to: Pastor; issued Aug. 1, 1989, discloses a method for authenticating documents. In a somewhat simplified embodiment of this method, a first party is provided with a secret key $E_s$ and at least one other key $E_i$; a second party is provided with a key $D_i$ and a third party is provided with a key $D_s$. The key pairs $E_s,D_s$ and $E_i,D_i$ are encryption-decryption keys for use with a "public key" encryption system such as RSA. RSA is a well known encryption scheme characterized by the use of encryption/decryption key pairs E,D such that if one key, E or D, is used to encrypt a message the other, D or E respectively must be used to decrypt it; and by the fact that it is hard to determine one key from knowledge of the other. Thus, by keeping the decryption key D secret the encryption key E may be publicly distributed so that any person may encrypt a message but only those knowing the decryption key D can decrypt the message.

In the method of the '961 patent the first party first forms a first level message M1 which includes key $E_i$. The first party then forms a second level message by encrypting the first level Message M1 with key $E_s$ to form a second level message M2 and then sends the second level message M2 to the second party. The first party may further encrypt the second level message M2 with the key $E_i$ before sending it. When the second level message M2 is received by the second party, it is decrypted, if necessary, using key $D_i$, the second party then encrypts information P using key $D_i$ and combines this encrypted information $D_i[P]$ with the second level message M2 to form a third level message M3. (By "combine" herein is meant some simple operation such as concatenation such that the components of the combined message may be easily recovered by the recipient.) The second party then sends the third level message M3 to the third party.

When the third level message M3 is received by the third party the third party recovers the second level message $E_s[M1]$ and decrypts it with the key $D_s$ to recover the first level message M1. The third party then recovers the key $E_i$ from the first level message and the encrypted information $D_i[P]$ from the third level message and decrypts the encrypted information to recover information P.

Thus, the third party verifies that the information P is an authentic message from the second party sent with the authorization of the first party.

The above described method has two major advantages for applications such as authentication of postal indicia. First, the third party, a postal service, does not need to maintain a large data bank of keys for each mailer, but need only have possession of the key $D_s$. Secondly, only the key $E_s$ need to be maintained with a high degree of security since indicia cannot be counterfeited using the key $D_s$ and only a single mailer is compromised if a key $D_i$ is compromised. This is advantageous since the postal service will wish to have the ability to authenticate indicia at each of thousands of post offices, while the first party, who may be a provider of postage metering services such as the assignee of the present application, need only have the key $E_s$ available at a single central location. Thus, the invention of the '961 patent provides a highly effective method for its intended purpose. However, it suffers from the disadvantage that to provide a high degree of security keys of a high order are required. It is estimated that it would require only a few seconds of computational time on a modern super computer to break an RSA encryption using a thirty (30) digit key, and it is estimated that adequate security for RSA encryption is achieved only with keys on the order of 150 to 200 digits. Since encrypted messages are of the same order as the key used for encryption, the resulting indicia using the invention of the '961 patent contains a great deal of information and is physically quite large. This is a disadvantage when the message must be incorporated in an indicia on a mail piece, where space is limited.

One encryption scheme which requires a smaller key is the DES technique. This encryption technique was developed by the National Bureau Standards and is commonly used in the financial industry, and requires a key of only 64 binary bits. DES is a "single key" encryption technique where the same key is used both for encryption and decryption. Since it is a single key technique this would mean that in applications such as authenticating postal indicia it would be necessary either for the postal service to maintain a data bank of keys for each mailer, or for the secret key to be available at each post office (since the key for decryption is identical to the key for encryption in DES); greatly decreasing security of the system. Also, recent mathematical discoveries relating to the factorability of large numbers raise some questions as to the security of the RSA technique raising the possibility that keys even larger than 200 digits may be necessary.

Another secret key encryption technique which is significantly more secure than RSA and requires a relatively small key (though somewhat larger than a DES key) is the "eliptical logarithm technique" this technique, while not as commonly used as DES is well known in the cryptographic art and will be described further below. The eliptical logarthm technique is also described in Koblitz, Neal; *A Course in Number Theory and Cryptography*: Chapter VI, Vol. 114, *Graduate Texts in Mathematics*: Springer-Verlog (1987)

Thus, it is an object of the subject invention to provide a method and apparatus for the authentication of communications which provides a high degree of security and does not require the party receiving the communication to maintain a large database of encryption keys.

It is a particular object of the subject invention to provide such method an apparatus which are suitable for the authentication of postal indicia.

Other objects and advantages of the subject invention will be apparent to those skilled in the art from consideration of the attached drawings and the detailed description set forth below.

BRIEF SUMMARY OF THE INVENTION

The subject invention takes advantage of the fact that an encryption can be viewed as a mapping of a set of numbers onto itself, where the mapping is easily computed by a person who has the key but is very hard to compute without the key. In particular, RSA encryption combines a key E and a message M to form an encryption message E[M] which is easily decrypted using a decryption key D to obtain $D[E[M]] = M$. The fact that it is not easy to "break" RSA (ie to find M from a knowledge of E and E[M]) implies that the sequence E[0], E[1] ... E[n] will appear to be a random permutation of the numbers 0, 1 ... n; where n is the largest number which can be encrypted using a particular key E. Thus, for an apparently random set of numbers $\{a'\}$, E[a'] will be in the range from 0-m; where m is much less than n. That is, for all a' the order of E[a'] is less than the order of n and may be expressed using substantially fewer digits than are needed to express numbers of order n. Since for any RSA key pair E,D either key decrypts information encrypted with the other key numbers a' may easily be found by computing D[x]; where x is a number in the range from 0−m. Thus, we have $D[x] = a'$ and $E[a'] = E[D[x]]$. Thus, if permissible messages are limited to the set $\{a'\}$ the encrypted messages E[a'] will be of the order of m and will require that a smaller amount of information be transmitted, then it would be required if permissible messages covered the entire range from 0-n.

Those skilled in cryptographic art will recognize that many details of RSA encryption have been omitted from the above description; particularly, that keys E and D each in fact consist of a pair of numbers (the actual encryption key and a modulus, and the actual decryption key and a modulus). However, such details are well known and are not believed necessary for an understanding of the subject invention.

The above objects are achieved and the disadvantages of the prior art are overcome in accordance with the subject invention by means of a method and apparatus which include; generation of an encryption/decryption key pair $E_s$, $D_s$, where the keys are of a first order selected to provide a predetermined level of security, a set of numbers $\{a'\}$ wherein numbers a' have the property that when encrypted with the key $E_s$ resulting encrypted numbers $E_s[a']$ are of an order substantially less than the first order, a hashing function H for mapping numbers of the first order onto numbers of a third smaller order, and an encryption key $K_i$. Key $E_s$, set $\{a'\}$, hashing function H, and key $K_i$ are provided to a first party; who maintains at least key $E_s$ in secret. Key $K_i$ is provided to a second party and is preferably maintained in secret. Key $D_s$ and hashing function H are provided to a third party, who maintains at least key $D_s$ in secret. To authorize a message the first party selects a particular one of the numbers a', encrypts the selected number a' with the key $E_s$ to obtain a particular value $E_s[a']$, an operates on the selected number a' with the hashing function H to obtain a second encryption key $K_j$, equal to H(a'). The first party then forms a first level message M1 which includes the encryption key $K_i$ and encrypts the first level message M1 with the second encryption key $K_j$. The first party then forms a second level message M2 which includes the encrypted first level message $K_j[M1]$ and the particular value $E_s[a']$, and sends the second level message M2 to the second party. To transmit a communication the second party then encrypts information P with key $K_i$ and combines the encrypted information $K_i[P]$ with the second level message M2 to form a third level message M3 and incorporates the third level message M3 in a communication sent to the third party. To authenticate the received message M3 the third party then recovers the particular value $E_s[a']$ from the second level message M2 comprised in the third level message M3, and decrypts the particular value $E_s[a']$ with key $D_s$ to obtain the selected number a'. The third party then operates on the selected number a' with the hashing function H to obtain the second encryption key $K_j$, recovers the encrypted first level message $K_j[M1]$ from the second level message M2, and decrypts the encrypted first level message $K_j[M1]$ with the second encryption key $K_j$ to obtain the first level message M1. The third party then recovers the encrypted information $K_i[P]$ from the third level message M3 and recovers the encryption key $K_i$ from the first level message M1. The third party then decrypts the encrypted information $K_i[P]$ with the encryption key $K_i$ to obtain the information P; whereby said third party verifies that the communication is an authentic communication sent by the second party with the authorization of the first party.

In accordance with one aspect of the subject invention, the second level message M2 is encrypted prior to transmission to the second party.

In accordance with another aspect of the subject invention the numbers a' each have a common, easily detectable property (e.g. bits in the binary representation of the numbers in preselected positions are identical for each number a' in the set $\{a'\}$) in order to make the task of generating counterfeit communications more difficult for an unauthorized person in possession of key $D_s$. This follows because it is hard to find numbers $D_s[x]$ having a particular property, if that property is sufficiently uncommon.

In accordance with another aspect of the subject invention the first level message M1 is encrypted using an eliptical logarithm technique.

In accordance with still another aspect of the subject invention the key $K_i$ varies for each transaction between the first and second parties and is determined by an initial key $K_1(0)$ and a function F such that $K_i(t)=F(K_i(t-1))$, where t is the number of the transaction.

In accordance with still another aspect of the subject invention the third level message M3 is transmit as part of an indicia on a mail piece.

Thus, it can be seen that the subject invention advantageously achieves the above object and overcomes the disadvantages of the prior art. Other objects and advantages of the subject invention will be apparent to those skilled in the art from consideration of the detailed description set forth below and the attached drawings.

DETAILED DESCRIPTION OF PREFERRED EMBODIMENTS OF THE SUBJECT INVENTION

Figure 1:
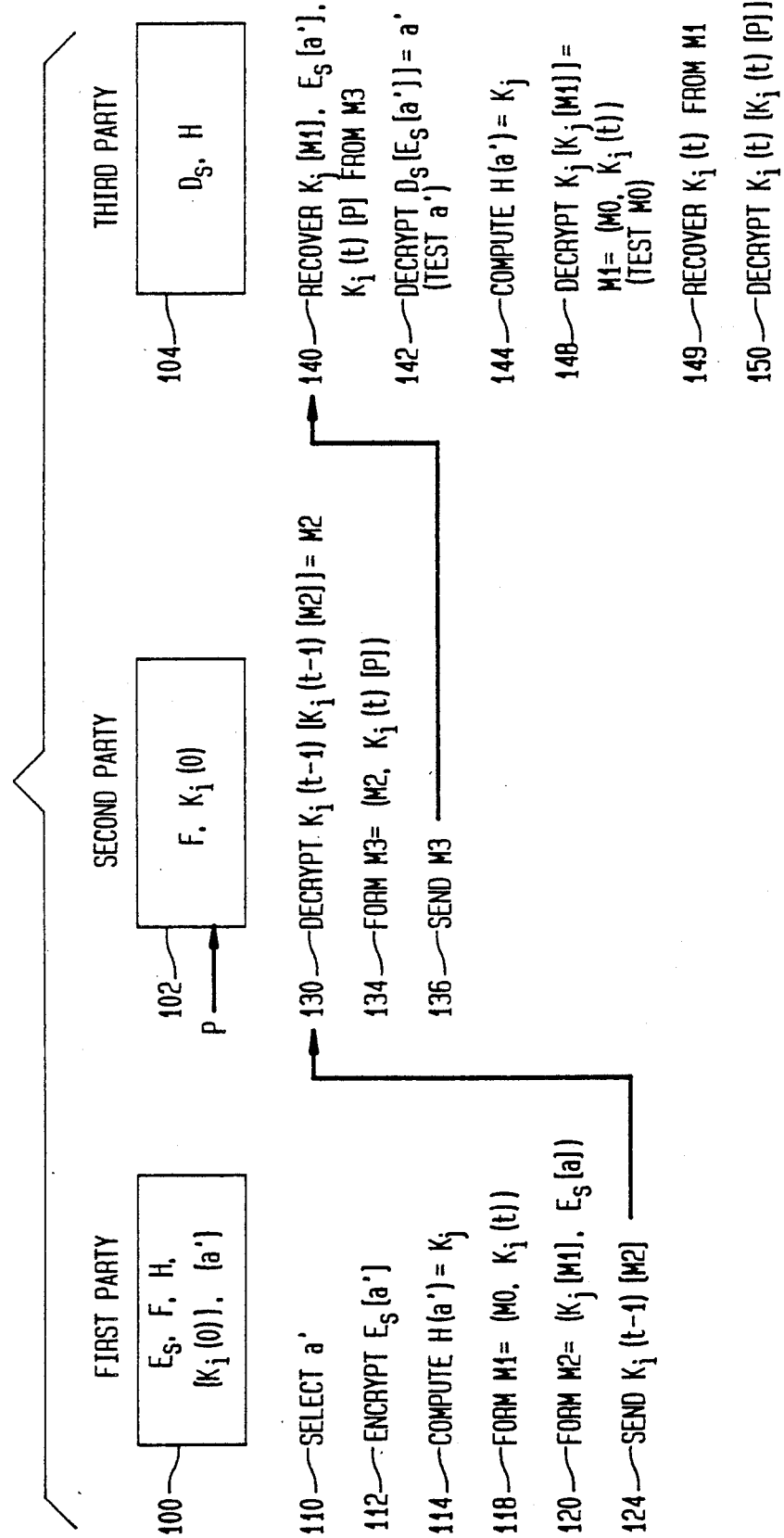
FIG. 1 shows a symbolic representation of a communication in accordance with the subject invention.

FIG. 1 shows a method for authenticating communications in accordance with a preferred embodiment of the subject invention. At 100 a first party is provided with a key $E_s$ which is part of an RSA encryptiondecryption key pair $E_s$, $D_s$; a function F; a hashing function H; a set of initial key values $\{K_i(0)\}$; and a set of numbers $\{a'\}$. Preferably key pair $E_s$, $D_s$ is an encryption/decryption key pair for RSA encryption, and is of an order selected to provided a predetermined level of security. Typically, key $E_s$ and $D_s$ might be numbers of from 150 to 200 digits. The set of numbers $\{K_i(0)\}$ is a set of encryption keys where key $K_i(0)$ is assigned to the ith second party and for each transaction t a new value is computed as: $K_i(t)=F(K_i(t-1))$. Preferably keys $K_i(t)$ are DES encryption key and function F may comprise DES encryption.

The set of numbers $\{a'\}$ has the property that when encrypted with key $E_s$ the resulting value $E_s[a']$ is in the range from 0 to m; where m is a number of an order substantially less than key $E_s$. As will be seen, limiting the possible messages to be encrypted to the set $\{a'\}$ assures that the encrypted messages can be transmitted with less information than would be necessary for transmission of all possible encrypted messages; i.e., all numbers in the range from 0-n, where n is the largest number which can be encrypted with key $E_s$.

Those skilled in the art will recognize that in general the set $\{a'\}$ will be too large for convenient storage as a list of numbers. Thus, the first party is preferably "provided" with set $\{a'\}$ by providing the first party with the ability to compute members of the set. In the embodiment under discussion the first party may compute values of $a'$ from the relationship $a'=D_s[x]$; where x is a number in the range from 0 to m.

In accordance with a preferred embodiment of the subject invention the set of numbers $\{a'\}$ may be further restricted by selecting set $\{a'\}$ such that numbers $a'$ share a common, easily identifiable property. For example, if numbers $a'$ were of the order of 600 binary bits the set $\{a'\}$ could be chosen so that for all numbers $a'$ a particular 50 predetermined bits would be equal. That is, for example, for all numbers $a'$ the first bit would be one, the seventh bit would be zero, etc. In this embodiment an off-line computation of a large number of values $D_s[x]$ would be made and the values computed would be examined to find some common property shared by a sufficiently large number of values. These values would then be selected as the set $\{a'\}$ and provided as a list to the first party. It will be hard for an unauthorized person in possession of key $D_s$ to find values of x such that $D_s[x]$ has the predetermined property, i.e., is a member of the set $\{a'\}$. This will increase the difficulty faced by such a person in producing counterfeit communications, as will be seen from the description set forth below.

Hashing function H maps number $a'$ onto a set of number lower order such that $H(a')=K_j$ may be used as an encryption key.

The ith second party is provided with the initial key $K_i(0)$ and function F and preferably maintains at least key $K_i(0)$ in secret.

The third party is provided with hashing function H and key $D_s$ and maintains at least key $D_s$ in secret.

To authorize a communication the first party, at 110, selects a particular value $a'$, and at 112 computes the encrypted value $E_s[a']$.

(From the discussion above it will be readily apparent that the operations at 110 and 112 are completely equivalent to selecting a value x of the desired order and computing $D_s[x]=a'$, and this description is intended to encompass this alternative.)

At 114 the first party operates on the selected number $a'$ with the hashing function H to compute a second encryption key $K_j$. $K_j$ is a key for single key encryption technique such as DES, and preferably is a key for a more secure encryption technique, eliptical logarithms, as will be described further below.

At 118 the first party then forms a first level message M1 which includes the key for the present transaction $K_i(t)$, and preferably includes an arbitrary, easily recognizable message M0, for example a plain text identification of the first party and the ith second party.

At 120 the first party forms a second level message M2 which includes the first level message encrypted with the second encryption key $K_j[M1]$ and the value $E_s[a']$. At 124 the second level message is encrypted with the key for the previous transaction to obtain $K_i(t-1)[M2]$, and sent to the ith second party.

At 130 the ith second party receives the encrypted second level message and decrypts it with the key for the previous transaction to obtain $K_i(t-1)[K_i(t-1)[M2]]=M2$. At 134 the second party then forms a third level message M3 which includes the second level message M2 and information encrypted with the key for the current transaction $K_i(t)[P]$. In a preferred embodiment the information P is postal information relating to a mail piece. Then at 136 the second party sends a communication including the third level message M3 to the third party. In the embodiment where the information P is postal information the communication will include the information P in plain text.

At 140 the third party receives the communication including the third level message M3 and recovers the value $E_s[a']$. At 142 the third party decrypts the value with the key $D_s$ to obtain $D_s[E_s[a']]=a'$. At this point in the preferred embodiment described above, the third party may test the selected number $a'$ to determine if it has a particular preselected property, i.e., is a valid member of the set $\{a'\}$. Then at 144 the third party applies the hashing function H to the selected number $a'$ to obtain $H(a')=K_j$. Then at 148 the third party recovers the encrypted first level message and decrypts it to obtain $K_j[K_j[M1]]=M1$. Optionally at this point the third party may examine the arbitrary message M0 to see if it makes sense, e.g., properly identifies the first and second parties. Then at 150 the third party decrypts the encrypted information to obtain $K_i(t)[K_i(t)[P]]=P$. In the preferred embodiment where information P is postal information the third party then compares the information P obtained by decryption with the information P in plain text to verify that the appropriate postage has been paid for the associated mail piece, as will be described further below.

As noted above, questions have recently been raised about the security of the RSA encryption technique. Accordingly, a more secure encryption technique may be desired. In accordance with a preferred embodiment of the second invention, a higher degree of security is achieved by encryption of the second level message M2 using an eliptical logarithm technique. While not in common use, as is DES, this encryption technique is well known to those skilled in the art and need not be described in detail for an understanding of the subject invention. A brief outline of eliptical logarithms is set forth below to facilitate understanding of the incorporation of this technique into the method and apparatus of the subject invention.

A group of points G is a set of points $\{x,y\}$ in the plane for which there exist an "addition" operation which associates any two points P1, P2 with a third point P3 so that the relationship $P1+P2=P2+P1=P3$. If we then define the relationships: $P1+P1=2*P1$; $P1+2*P1=3*P1;\ldots$ we can speak of a "multiplication" operation such that $K*P$ is a point in group G for any value K which is an integer.

Such a group may be formed using the known eliptical curve technique. For a group G so formed there exists a function X which maps numbers (i.e., messages) onto points of the group and an inverse function $X_{-1}$; and both functions X and $X_{-1}$ are easily computed. Further, for each integer K there exists and inverse $K_{-1}$ such that $(KK_{-1}) \bmod Pr = 1$ (where Pr is a large prime number whose significant will be explained below) and $K^{-1}*(K*P1)=P1$. When group G is formed using eliptical logarithm the points have the property that $(K*P1)=PK$ is easily computed while it is hard to determined K from knowledge of $K*P1, K*P2, \ldots$ and $P1, P2, \ldots$; that is, the code is hard to break. Specifically it is estimated that where group G contains from $10^{30}$ to $10^{40}$ points it would require thousands of years of computational time on a modern super computer to break the code.

For a group of this many points it is of course impossible to store the points as a list and a user is "provided" with the points by being provided with information which will allow computation of the points in the group. In a preferred embodiment the points in group G represent solutions to the equation:

$(Y_2=x^3+bx+c) \bmod Pr$, where Pr is a prime number on the order of from $10^{30}$ to $10^{40}$. In general it may prove necessary to modify the above relation by a mathematical operation known as "twisting" in order to provide a complete group G. This operation is well understood by those skilled in the cryptographic art and need not be described further here for an understanding of the subject invention. It will also be understood by those skilled in the art that the operations of "additions" and "multiplication" are not the familiar operations of arithmetic and these terms have been used in an extended, analogous sense herein. The actual computations involved in "additions" and "multiplication" for eliptical curves are also well understood by those skilled in the art and need not be described further here for an understanding of the subject invention.

Thus eliptical curves may be used to encrypt a message (i.e., a number between 0 and Pr) by mapping the message onto a point Q, "multiplying" Q by a secret key K, and mapping $K*Q$ onto the numbers between 0 and Pr. Since it is apparent from the above description that for values of K greater than Pr the sequence of points produced by "multiplication" simply begins to repeat, it follows that key K may be specified as a number on the order of Pr. Thus, eliptical curves provide an encryption technique which is highly secure but where substantially less information may be transmitted than is necessary in the RSA technique.

Figure 2:
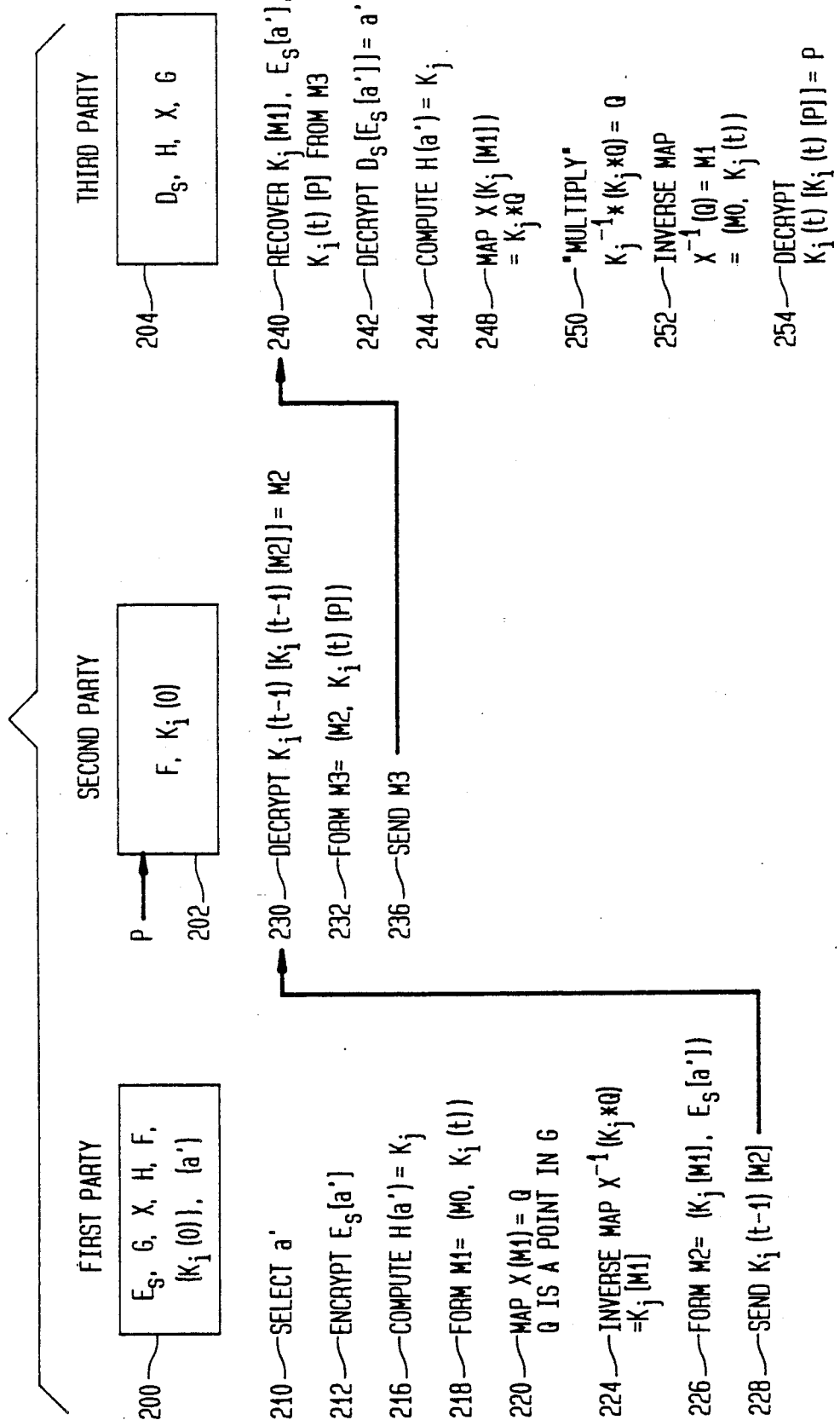
FIG. 2 shows a symbolic representation of a communication in accordance with the subject invention wherein information is encrypted using eliptical logarithms.

Turning now to FIG. 2, a preferred embodiment of the subject invention is described where the first level message M1 is encrypted using eliptical curves.

At 200 a first party is provided with an encryption key $E_s$ from an RSA encryptiondecryption key pair $E_s,D_s$; a hashing function H; a function F; a set of initial key values $\{K_i(0)\}$: and a set of numbers $\{a'\}$, in the same manner as is described above with reference to FIG. 1. At least encryption key $E_s$ is maintained in secrecy by the first party. Additionally, the first party is provided with a group of points G and a function X (which implicitly includes the inverse function $X^{-1}$) for mapping messages onto points in group G. Preferably group G is also kept secret. At 202 the ith second party is provided with function F and initial key $K_i(0)$, and preferably maintains at least key $K_i(0)$ securely. At 204 a third party is provided with key $D_s$, group G, hashing function H, and mapping function X. The third party maintains at least key $D_s$, and preferably group G, in secret.

To authorize a message the first party, at 210 and 212 selects a number $a'$ and encrypts the number $a'$ to obtain a particular value $E_s[a']$ in the same manner as described above with respect to FIG. 1. At 216 the number $a'$ is operated on with hashing function H to obtain a second encryption key $K_j$ equal to $H(a')$. This operation does not differ in principle from that described with respect to FIG. 1, though in general keys $K_j$ used with an eliptical logorithm encryption technique will be larger than those used with DES, though smaller than those used with RSA.

At 218 the first party forms a first level message and one which, again, includes an encryption key $K_i(t)$ for the current transaction t and may include an arbitrary, recognizable message M0. At 220 the first party operates on first level message M1 with function X to obtain a point Q in group G. At 224 the first party "multiplies" point Q by key $K_j$ and operates on the resulting point with inverse function $X^{-1}$ to obtain an encrypted form of first level message M1: $X^{-1}(K_j*Q) = K_j[M1]$.

In the same manner as described with respect to FIG. 1, the first party then, at 226 and 228 forms a second level message M2 which includes the encrypted first level message $K_j[M1]$ and the particular value $E_s[a']$; encrypts the second level message with the key for the previous transaction to obtain $K_i(t-1)[M2]$ and sends this to the ith second party.

Inspection of FIG. 2 shows that the ith second party performs the same operations as described in FIG. 1, decrypting the received message at 230, forming a third level message M3 including the second level message M2 and encrypted information $K_i(t)[P]$ at 232 and sends this third level message M3 to the third party at 236.

At 240 the third party receives the third level message M3 and recovers the particular value $E_s[a']$. At 242 the third party decrypts the particular value to obtain $D_s[E_s[a']] = a'$, and at 244 operates on the selected value $a'$ with the hashing function H to obtain $H(a') = K_j$. At 248 the third party recovers the encrypted first level message and operates on it with the mapping function X to obtain the point $X(K_j[M1]) = K_j*Q$. At 250 the third party then finds the inverse $K_j^{-1}$ and "multiplies" to obtain $K_j^{-1}*(K_j*Q) = Q$, and at 252 applies the inverse function $X^{-1}$ to obtain $X^{-1}(Q) = M1$. At 254 the third party then recovers the current encryption key $K_i(t)$ and the encrypted information to obtain $K_i(t)-[K_i(t)[P]] = P$. Again, as in FIG. 1, the third party has verified that the communication which incorporates the third level message M3 is an authentic communication from the ith second party sent with the authorization of the first party.

Figure 3:
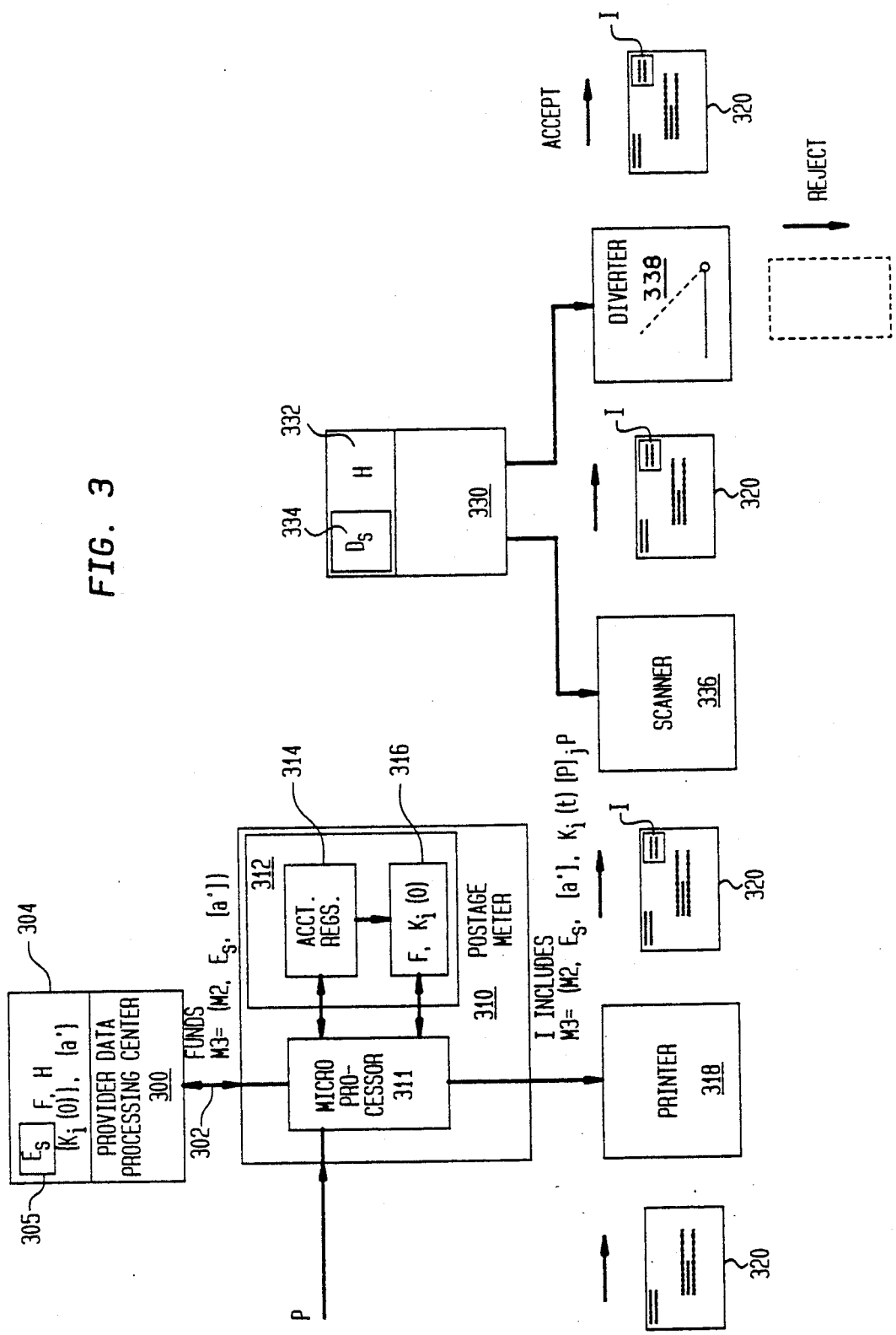
FIG. 3 shows a schematic block diagram of a system for authorization, transmission, and authentication of postal indicia in accordance with the subject invention.

FIG. 3 shows an apparatus for authenticating postal indicia. Data processing center 300 is controlled by a provider of postage metering services, such as the assignee of the subject application. Center 300 also includes memory 304 for storing function F, hashing function H, a set of initial keys $\{K_i(0)\}$, and a set of numbers $\{a'\}$. Secure memory 305 is provided for storing key $E_s$. Security for memory 305 may be provided by control, physical and/or software, of access to memory 305, and/or encryption of key $E_s$. Center 300 is connected over a communications link 302 to an electronic postage meter 310 in the possession of the ith mailer. Postage meter 310 is an electronic meter which produces an encrypted indicia in substantially the manner described in U.S. Pat. No. 4,660,221; to: Dlugos wherein postal information is encrypted and printed on a mail piece, or a document associated with a number of mail pieces, and corresponding information is also printed on the mail piece in plain text. Postage meter 310 is controlled by microprocessor 311 and includes a physically secure structure 312 which encloses accounting registers 314 for accounting for the funds expended in printing postage and which also encloses conventional apparatus 316 for storing a DES encryption key $K_i$ and for encrypting postal information P with the key $K_i$. Preferably key $K_i$ will be changed for each transaction in the manner described above and function F and initial key $K_i(0)$ will be stored in secure apparatus 316. Postage meter 310 controls a conventional printer 312 which may be a dot matrix printer or an equivalent general purpose printer.

A postal service such as the USPS is provided with a data processing apparatus 330 for authenticating indicia, as will be described below. Apparatus 330 includes memory 332 for storing hashing function H and secure memory 334 for storing key $D_s$. Preferably data in indicia I is sufficiently reduced that approximately 3 or 4 lines of conventional bar code will suffice to represent the data. Scanner 336 scans mail pieces to recover information from postal indicia I and transmit this information to data processing apparatus 330. Data processing apparatus 330 then recovers the encrypted postal information P from the indicia, decrypts it and compares it to the postal information P in plain text. If the decrypted information and the plain text information compare data processing apparatus 330 controls a deverter mechanism 338 to accept the mail piece, and otherwise to reject the mail piece for further processing.

Preferably data processing 300 will also be a source of funds for charging meter 310. As is conventional in postage meters, postage meter 310 may only print postage up to the amount of funds with which the meter has been charged. Preferably meter 310 will be charged from data processing center 300 in a conventional manner described in U.S. Pat. No. 4,376,299; to: Rivest, which is hereby incorporated by reference. Such a meter recharging service is provided by the assignee of the subject application under the trademark "Postage-By-Phone", and a further description of charging of postage meters is not believed necessary to an understanding of the subject invention.

To authorize printing of postage indicia, data processing center 300 operates in the manner described above with respect to FIGS. 1 and 2 to generate and encrypted authorization message $K_i(t-1)[M2]$. (Though the authorization of postal indicia has been described herein with respect to a single mail piece it will be apparent that the authorization message M2 may be valid for a specific period of time, a specific number of mail pieces, or may be renewed each time meter 310 is recharged.) Meter 310 then forms the third level message M3 as described above with respect FIGS. 1 and 2, with the encryption of postal information P being carried out by means located within the physically secure structure 312. Meter 310 then controls printer 314 to print an indicia I including third level message M3 and plain text postal information P.

As is known for postage meters which print an encrypted indicia, incorporating the means for encryption within a physically secure structure prevents a dishonest mailer from accessing the information and using it to print unauthorized indicia in excess of the available funds. Of course, this also protects against access by a third party. The physical security of postage meters is conventional and need not be described further here for an understanding of the subject invention.

It will be apparent that meter 310 differs significantly from the meter of U.S. Pat. No. 4,660,221 only in that modifications must be made to receive and decrypt the second level authorization message M2 and to incorporate message M2 into the third level message M3. Since known postage meters already include provision for receipt of encrypted postage recharging information and decrypting of that information it will apparent that such changes are well within the skill of person of ordinary skill in the art.

As can be seen in FIG. 3, printer 318 prints third level message M3 and plain text postal information P on mail piece 320 as part of indicia I and mail piece 320 is delivered to a postal service where it is scanned by scanner 336 to recover third level message M3, and plain text postal information P, which are then transmitted to data processing apparatus 330. Apparatus 330 then decrypts postal information P in the manner described above with respect to FIGS. 1 and 2 and compares the decrypted postal information with the plain text postal information. If they compare mail piece 320 is accepted, and if they do not compare apparatus 330 controls gate mechanism 338 to divert mail piece 320 for further processing.

The embodiments described above and shown in the attached drawings have been provided by way of illustration only, and numerous other embodiments will be apparent to those skilled in the art from consideration of the present disclosure. Accordingly, limitations on the subject invention are to be found only in the claims set forth below.

What is claimed is:

1. A method for authenticating communications comprising the steps of:
generating:
   an encryption/decryption key pair consisting of key $E_s$ and $D_s$ said keys being of a first order selected to provide a predetermined level of security;
   a set numbers of $\{a'\}$ wherein numbers $a'$ which are members of set $\{a'\}$ are approximately of said first order, and have the property that when encrypted with said key $E_s$ resulting encrypted numbers $D_s[a']$ are of a second order substantially less than said first order;
   hashing function H for mapping number of said first order onto a third, smaller order; and,
   an encrypting key $K_i$;
providing said key $E_s$, said set $\{a'\}$ said hashing function H and said key $K_i$ to a first party;
providing said key $K_i$ to a second party;
providing said key $D_s$ and said hashing function H to a third party;
said first party:
   selecting a particular one of said numbers $a'$;
   encrypting said selected number $a'$ with said key $E_s$ to obtain a particular value $E_s[a']$;
   operating on said selected number $a'$ with said hashing function H to obtain a second encrypting key $K_j$, equal to $H(a')$;
   forming a first level message M1 including said encryption key $K_i$;
   encrypting said first level message M1 with said second encrypting key $K_j$;
   forming a second level message M2 including said encrypted first level message $K_j[M1]$ and said particular value $E_s[a']$;
   sending said second level message M2 to said second party;
said second party then:
   encrypting information P with said key $K_j$;
   combining said second level message M2 with said encrypted information $K_i[P]$ to form a third level message M3; and
   sending a communication comprising said third level message M3 to said third party;
said third party then:
   recovering said particular value $E_s[a']$ from said second level message M2 comprised in said third level message M3;
   decrypting said particular value $E_s[a']$ with said key $D_s$ to obtain said selected number $a'$;
   operating on said selected number $a'$ with said hashing function H to obtain said second encryption key $K_j$;
   recovering said encrypted first level message $K_j[M1]$ from said second level message M2 and decrypting said encrypted first level message $K_j[M1]$ with said second encryption key $K_j$ to obtain said first level message M1;
   recovering said encrypted information $K_i[P]$ from said third level message M3 and said encryption key $K_i$ from said first level message M1; and
   decrypting said encrypted information $K_i[P]$ with said encryption key $K_i$ to obtain said information P; whereby said third party acquires a basis to believe that said information P is an authentic communication sent by said second party with the authorization of said first party.

2. A method as described in claim 1, wherein said second level message M2 is encrypted with said key $K_1$ prior to being sent to said second party and is decrypted by said second party.

3. A method described in claim 1, wherein said key $K_1$ varies as for each transaction between said first and second users and is determined by an initial key $K_i(0)$ and a function F such that $K_i(t)=F(K_i(t-1))$, where $K_i(t)$ is the key for transaction number t.

4. A method as described in claim 1, wherein said numbers $a'$ share a recognizable property such that it is hard for an unauthorized person in possession of said key $D_s$ to find values of $a'$ having said property.

5. A method as described in claim 2, wherein said numbers $a'$ share a recognizable common property such that it is hard for an unauthorized person in possession of said key $D_s$ to find values of $a'$ having said property.

6. A method as described in claim 3, wherein said numbers $a'$ share a recognizable property such that it is hard for an unauthorized person in possession of said key $D_s$ to find values of $a'$ having said property.

7. A method as described in claims 1, 2, 3, 4, 5 or 6, wherein said first level message M1 is encrypted with an eliptical logarithm technique.

8. A method as described in claim 7, wherein said third level message M3 is incorporated as part of a postal indicia on a mail piece.

9. A method as described in claim 1, 2, 4, 5, or 6, wherein said third level message M3 is incorporated as part of a postal indicia on a mail piece.

10. A system for authenticating postal indicia, comprising:
authorizing apparatus, said authorizing apparatus further comprising:
   first storage means for storing one key $E_s$, $D_s$, and keys $E_s$, $D_s$, being of a first order selected to provide a predetermined level of security;
   second storage means for storing:
      a set of number $\{a'\}$ each number $a'$ having the property that when encrypted with said key $E_s$ the resulting values $E_s[a']$ are of a second order substantially less than said first order;
      a hashing function H for mapping number $a'$ onto numbers of a third smaller order; and,
      an encryption key $K_i$;
   first data processing means for:
      selecting a particular one of said number $a'$;
      encrypting said selected number $a'$ with said key $E_s$ to obtain a particular value $E_s[a']$;
      operating on said selected number $a'$ with said hashing function H to obtain a second encryption key $K_j$, equal to $H(a')$;
      forming a first level message M1 including said encryption key $k_j$;

encrypting said first level message M1 with said second encryption key $K_j[M1]$;

forming a second level message M2 including said encrypted first level message $K_j[M1]$ and said particular value $E_s[a']$; and, transmission means responsive to said first data processing means for sending said second level message M2;

franking apparatus, for franking a mail piece, said franking apparatus comprising:

first receiving means for receiving said second level message M2 second receiving means for receiving postal information P relating to a mail piece;

accounting means responsive to said second receiving means for accounting for funds expended in franking said mail piece;

encryption means responsive to said accounting means for encrypting said postal information P with said key $K_i$ only if said funds have been accounted for by said accounting means;

second data processing means responsive to said first and second receiving means and to said encryption means for:

inputting said encrypted postal information $K_i[P]$ from said encryption means;

inputting said second level message M2 from said first receiving means inputting said postal information P from said second receiving means; and forming a third level message M3 including said second level message M2 and said encrypted postal information $K_i[P]$; and, printing means responsive to said second data processing means for printing an indicia on said mail piece, said second data processing means controlling said printing means to print said indicia including said third level message M3 and said postal information P in plain text; and, authenticating apparatus, said authenticating apparatus further comprising:

scanning means for scanning said indicia, upon receipt of said mail piece, to read said third level message M3 and said postal information P form said plain text;

third storage means for securely storing said key $D_S$;

fourth storage means for storing said hashing function H;

third data processing means responsive to said third and forth storage means, and said scanning means for:

recovering said particular value $E_s[a']$ from said third level message M3;

decrypting said particular value $E_s[a']$ with said key $D_s$ to obtain said selected number $a'$;

operating on said selected number $a'$ with said hashing function H to obtain $H(a')$ equal to said second encryption key $K_j$;

recovering said encrypted first level message $K_j[M1]$ from said third level message M3;

decrypting said encrypted first level message $K_j[M1]$ with said key $K_j$ to obtain said first level message M1;

recovering said encryption key $K_i$ from said first level message M1;

decrypting said encrypted postal information $K_i[P]$ to obtain said information P, inputting said information P as scanned from said plane text and comparing said information P, as input, with said information P, as decrypted, to authenticate said indicia.

11. A system as described in claim 10, wherein said second level message M2 is encrypted with said key $K_j$ prior to being sent to said franking apparatus and is decrypted by said franking apparatus.

12. A system as described in claim 10, wherein said key $K_i$ varies as for each transaction between said first and second users and is determined by an initial key $K_i(0)$ and a function F such that $K_i(t)=F(K_i(t-1))$, where $K_i(t)$ is the key for transaction number t.

13. A system as described in claim 10, wherein said numbers $a'$ share a recognizable property such that it is hard for an unauthorized person in possession of said key $D_S$ to find values of $a'$ having said property.

14. A system as described in claim 11, wherein said numbers $a'$ share a recognizable property such that it is hard for an unauthorized person in possession of said key $D_S$ to find values of $a'$ having said property.

15. A system as described in claim 12, wherein said numbers $a'$ share a recognizable property such that it is hard for an unauthorized person in possession of said key $D_S$ to find values of $a'$ having said property.

16. A system as described in claims 10, 11, 12, 13, 14 or 15, wherein said numbers $a'$ share a recognizable property such that it is hard for an unauthorized person in possession of said key $D_S$ to find values of $a'$ having said property.

17. A method as described in claim 16, wherein said third level message M3 is incorporated as part of a postal indicia on a mail piece.

18. A method as described in claims 10, 11, 12, 13, 14 or 15, wherein said third level message M3 is incorporated as part of a postal indicia on a mail piece.

19. An apparatus for providing an authenticating message, comprising:

first storage means for storing one key $E_S$ of an encrypting/decryption key pair $E_S, D_S$, said keys $E_S$, $D_S$ being of a first order selected to provide a predetermined level of security;

second storage means for storing:

a set of number $\{a'\}$ each number $a'$ having the property that when encrypted with said key $E_s$ the resulting values $E_s[a']$ are of a second order substantially less than said first order;

a hashing function H for mapping number $a'$ onto number of third smaller order; and, an encryption key $K_i$;

data processing means for:

selecting a particular one of said number $a'$;

encrypting said selected number $a'$ with said key $E_s$ to obtain a particular value $E_s[a']$;

operating on said selected number $a'$ with said hashing function H to obtain a second encryption key $K_j$, equal to $H(a')$;

forming a first level message M1 including said encryption key $K_i$;

encrypting said first level message M1 with said second encryption key $K_j$ to obtain $K_j[M1]$;

forming a second level message M2 including said encrypted first level message $K_j[M1]$ and said particular value $E_s[a']$; and, transmission means responsive to said data processing means for sending said second level message M2.

20. Franking apparatus for franking a mail piece, said franking apparatus comprising:

first receiving means for receiving a message M2;

second receiving means for receiving postal information P relating to a mail piece;

accounting means responsive to said second receiving means for accounting for funds expended in franking said mail piece;

encryption means responsive to said accounting means for encrypting said postal information P with a key $K_i$ only if said funds have been accounted for by said accounting means;

data processing means responsive to said first and second receiving means and to said encryption means for:

inputting said encrypted postal information $K_i[P]$ from said encrypting means;

inputting said second level message M2 from said first receiving means inputting said postal information P from said second receiving means; and forming a message M3 including said message M2 and said encrypted postal information $K_i[P]$; and, printing means responsive to said data processing means for printing an indicia on said mail piece, said data processing means controlling said printing means to print said indicia including said third level message M3 and said postal information P in plain text.

21. Authenticating apparatus for authenticating an indicia for a mail piece comprising:

scanning means for scanning said indicia, upon receipt of said mail piece, to read a message M3 and postal information P from plain text in said indicia;

first storage means for securely storing a key $D_s$;

second storage means for storing a hashing function H;

data processing means responsive to said first and second storage means, and said scanning means, for:

recovering particular value $E_s[a']$ from said message M3;

decrypting said particular value $E_s[a']$ with said key $D_s$ to obtain $a'$;

operating on $a'$ with said hashing function H to obtain $H(a')$ equal to a second encryption key $K_j$;

recovering a encrypted message $K_j[M1]$ from said message M3;

decrypting said encrypted message $K_j[M1]$ with said key $K_j$ to obtain message M1;

recovering an encryption key $K_i$ from said first level message M1;

recovering encrypted postal information $K_i[P]$ from said third level message M3 and decrypting said said encrypted postal information $K_i[P]$ to obtain information P;

inputting said information P as scanned from said plain text and comparing said information P, as input, with said information P, as decrypted, to authenticate said indicia.

* * * * *